United States Patent [19]

Bayer et al.

[11] Patent Number: 4,679,837
[45] Date of Patent: Jul. 14, 1987

[54] HARD BAR BUMPER FOR VEHICLES

[75] Inventors: Dean M. Bayer; Larry J. McCoy, both of Anderson, Ind.; Chris A. Thomason, Sterling Heights, Mich.; Thomas P. Tranbarger, Pendleton; Marco E. Rodriguez, Anderson, both of Ind.

[73] Assignee: General Motors Corporation, Detroit, Mich.

[21] Appl. No.: 848,202

[22] Filed: Apr. 4, 1986

[51] Int. Cl.⁴ .............................................. B60R 19/04
[52] U.S. Cl. .................................... 293/102; 293/132
[58] Field of Search ................ 293/102, 110, 120, 121, 293/122, 132, 143, 155

[56]  References Cited

U.S. PATENT DOCUMENTS

| | | | |
|---|---|---|---|
| 3,471,979 | 10/1969 | Herr | 293/121 X |
| 3,610,609 | 10/1971 | Sobel | 293/143 X |
| 3,734,554 | 5/1973 | Schwabenlender | 293/121 |
| 3,741,560 | 6/1973 | Schaller | 293/121 X |
| 4,079,975 | 3/1978 | Matsuzaki et al. | 293/132 |
| 4,251,096 | 2/1981 | Stock | 293/151 X |
| 4,252,355 | 2/1981 | Goopy et al. | 293/132 X |
| 4,278,282 | 7/1981 | Roubinet et al. | 293/132 |
| 4,354,700 | 10/1982 | Goopy et al. | 293/132 |
| 4,413,856 | 11/1983 | McMahon et al. | 293/132 X |
| 4,460,206 | 7/1984 | Peter | 293/120 X |

FOREIGN PATENT DOCUMENTS

| | | | |
|---|---|---|---|
| 2316220 | 10/1974 | Fed. Rep. of Germany | 293/155 |
| 2509718 | 9/1976 | Fed. Rep. of Germany | 293/155 |
| 2154953 | 9/1985 | United Kingdom | 293/122 |

Primary Examiner—Robert B. Reeves
Assistant Examiner—Russell D. Stormer
Attorney, Agent, or Firm—Charles R. White

[57] ABSTRACT

A high strength and low mass hard bar bumper assembly which has an interior bulk head to maximize beam face support for minimizing face dishing which maintains beam section shape by tying the flanges together and which transfers the impact loads from the beam face to the beam flanges. In the preferred embodiment, a hollow cylinder is used as the tie bolt and a resilient opened-celled bulkhead spacer is used to transfer loads from the face through the hollow tie bolt to the flanges.

4 Claims, 4 Drawing Figures

HARD BAR BUMPER FOR VEHICLES

This invention relates to hard bar vehicle bumpers and more particularly to a channel-type beam bumper with upper and lower flanges tied together by vertical force transmitting hollow cylinders for optimized strength and reduced weight. The outer face of the bumper is supported by resilient bulk heads seated on the cylinders to minimize face dishing and to transfer impact loads from the face to the flanges through the cylinders.

To meet the need for a strong lightweight bumper, the present invention utilizes a channel-shaped beam bumper preferably of aluminum, steel or other suitable material having a profiled outer face and upper and lower flanges which extend inwardly from the face toward the body work of the vehicle. These beams extend laterally across front and rear ends of the vehicle and are generally C-shaped in cross-section to provide a hard bar beam bumper assembly for effectively protecting the body work and other components of the vehicle from impact damage.

Prior to the present invention, beam bumpers have been fabricated from aluminum, steel and other materials with a relatively complex and heavy backing or support often attached by energy absorbing devices to the vehicle frame or other support structure. While these prior bumpers provide effective protection of the vehicle, they are costly and often add substantially to the weight of the vehicle and thereby detract from vehicle operating economy. Furthermore, the outer faces of these bumpers were subjected to excessive dishing when impacted often resulting in costly repair or replacement.

To meet higher standards for greater vehicle economy while embodying good protection for the vehicle with minimized face dishing and other damage from impact loads, the present invention is drawn to a new and improved lightweight hard bar beam bumper extending laterally across the front or rear end of the vehicle. The preferred design of the bumper of this invention incorporates an outer beam preferably of aluminum or steel of generally C-shaped in cross section although engineering plastics, fiberglass or other materials may be used. The bumper assembly of this invention has an outer vertical impact face aesthetically profiled and top and bottom flanges that extend inwardly toward the vehicle body, which form the strongest part of the beam and which are operatively interconnected to increase bumper strength. Importantly, there is a new and improved bulkhead assembly formed by the vertical cylindrical connectors and by the energy absorbing spacers which provide improved beam face support to minimize dishing of this part of the beam. This invention also effectively maintains beam section shape by tying the flanges together so that impact loads are transferred from the face of the beam to the upper and lower flanges through the bulkhead assembly. The vertical connectors of this invention are preferably provided by a metallic hollow cylinders shaped so that they can be used as tie bolts. The invention incorporates resilient open-celled energy absorbing spacers which cooperate with the vertical connectors to form the bulkhead assemblies. Each spacer is a block like cellular matrix having a plurality of laterally and vertically intersecting walls that form a plurality of longitudinally extending cells with a curved rear saddle or seat to fit on the tie bolt cylinders. These walls transfer loads to the hollow cylindrical tie bolts but can, by deflecting, absorb energy. The energy absorbing spacers are made from a suitable olefin material and have memory to return to the original pre-impact position and accordingly exert a restoring force on a dished part of the face to prevent or minimize permanent damage thereto. Such energy absorbing media is generally described in U.S. Pat. No. 4,413,856, issued Nov. 8, 1983 to McMahan et al, entitled "Hardbar Energy Absorbing Bumper System For Vehicles" assigned to the assignee of this invention and hereby incorporated by reference.

In this invention the spacer is used to transfer loads from the outer face through the cylinder to the high strength flanges of the impact bar. This spacer provides for uniform loading of the tie cylinder which reduces the beaming stress on the cylinder as compared to point loading. Furthermore, the cylinder is a lightweight large diameter connector which is flared on the top end to extend along the top flange and is threaded on the bottom to receive a jam nut advanced against the bottom face to thereby form an interconnecting strap so that the beam assembly is completed with a minimal of three major pieces. The cylinder can be made of similar material as the beam to eliminate galvanic corrosion. The jam nut can be coated if the dissimilar materials are used. This invention requires no welding so steel and aluminum or other dissimilar metals can be used. Holes in the beam's flanges for the tie bolts are located on the tension side of the neutral axis the through the beam bumper for increased beam strength and improved bumper performance. The resilient spacers are readily made in existing energy absorbing molds to provide reduced costs and optimized effectiveness.

These and other features, objects and advantages of this invention will become more apparent from the following detailed description and drawing in which.

Figure 1:
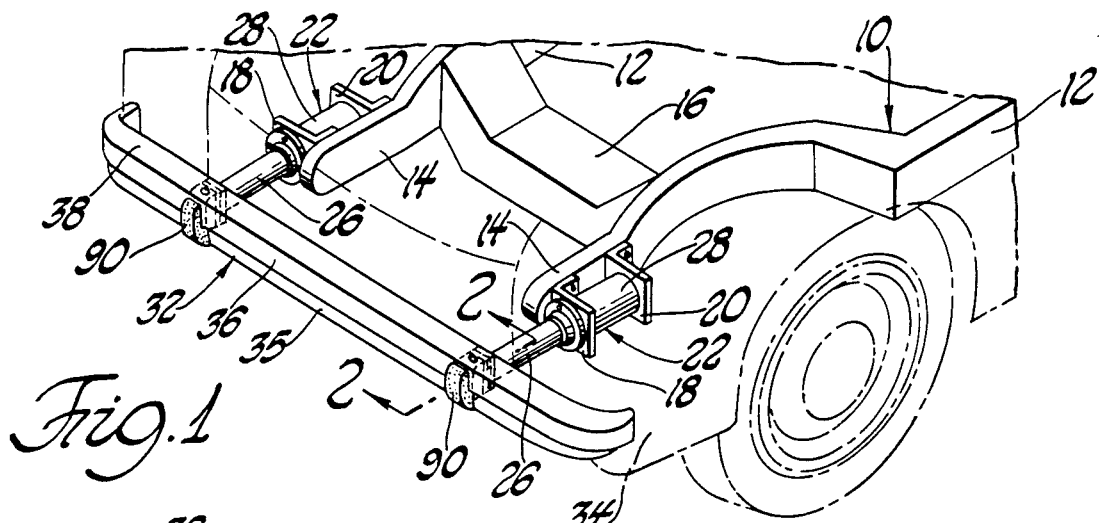
FIG. 1 is a perspective view of an end portion illustrating a hard bar bumper assembly attached to the chassis frame of a vehicle.

Turning now in greater detail to the drawing, FIG. 1 illustrates an end portion of a vehicle having a chassis frame 10 comprising a pair of laterally spaced and longitudinally extending side rails 12 with horn portions 14 which are interconnected by a cross frame member 16. Bolted to each horn portion are first and second L-shaped brackets 18 and 20 that are longitudinally spaced from one another which connect identical energy absorbing units 22 to the chassis frame 10. These units may be like those disclosed in U.S. Pat. No. 4,054,311, issued Oct. 18, 1977 to L. Gute, entitled "Energy Absorbing With Improved Pressure Relief Valve" assigned to the assignee of this invention and hereby incorporated by reference. Each energy absorber unit has an inner tube 26 that longitudinally extends from telescopic mounting within an outer tube 28 which is secured to the brackets 18 and 20 as described in the above-referenced patent to Gute. The outer tube has a bracket 30 affixed to its outer end generally C-shaped in cross-section to serve as a connector bracket for a bumper assembly 32 that extends laterally across and outwardly of the vehicle to protect the body work 34 and other components from impact damage. If desired, the energy absorber units 22 can be eliminated and the bumper assembly can be connected in any suitable fashion to the horns 14 of the chassis frame or to other support structure of the vehicle.

Figure 2:
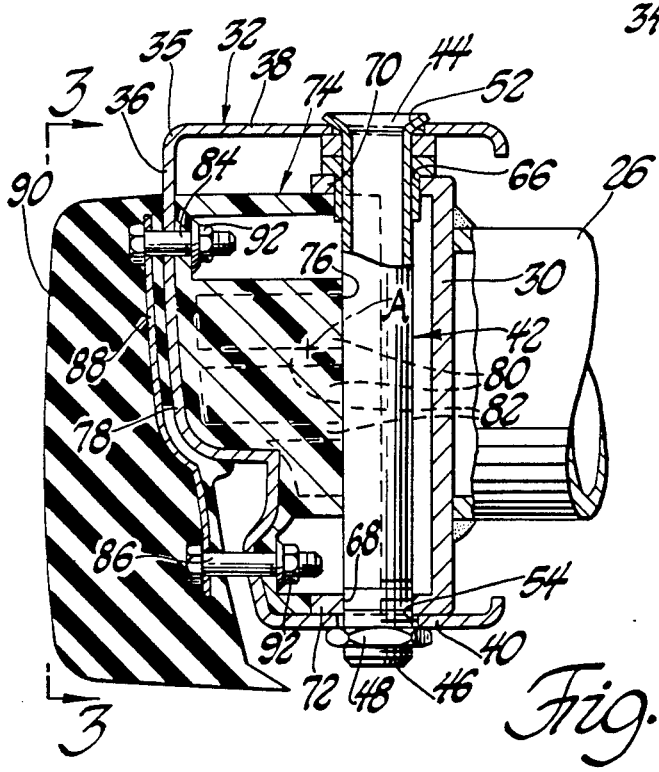
FIG. 2 is a cross-sectional view taken generally along lines 2—2 of FIG. 1.
Figure 3:
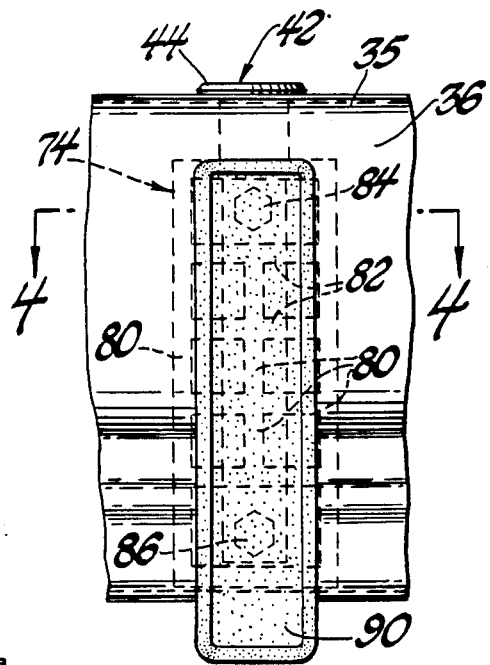
FIG. 3 is a front view taken along lines 3—3 of FIG. 2.
Figure 4:
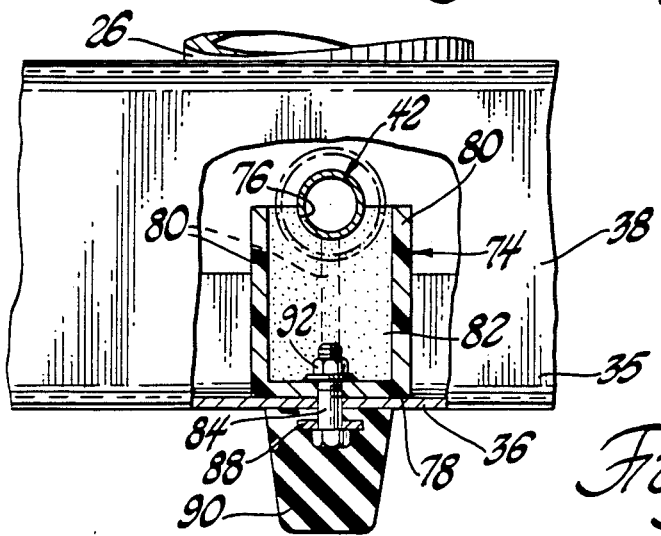
FIG. 4 is a cross-sectional view taken along lines 4—4 of FIG. 3.

The bumper assembly 32 comprises an elongated bumper beam 35 which may be made of aluminum, steel or other suitable material into an elongated channel member, generally C-shaped in cross-section, with a profiled vertical face 36 which provides a styled appearance. The bumper beam has upper and lower flanges 38 and 40 that are from their shape and location the strongest part of the beam. These flanges extend inwardly from the forward face 36 toward the body work of the vehicle. An elongated hollow metallic cylinder is used as a tie bolt or strap 42 to interconnect the upper and lower flanges 38 and 40. The upper end of the cylinder is flared to form an annular head 44 which circumferentially contacts the upper flange 38 while the lower end is threaded at 46 to receive a jam nut 48 threaded into contact with the lower flange 40. As best shown in FIG. 2, the hollow tie bolt 42 has a large diameter, 1" for example, for optimized strength and reduced weight which extends through vertically aligned openings 52, 54 in the top and bottom flanges of the bumper beam. The axis of the tie bolt is on the tension side of the horizontal neutral axis "A" of the beam. This is a high strength position and the flanges will not permanently deform on low speed impacts suchas 2.5 mph. With the hollow tie bolt 42 in place and with the jam nut threaded on the lower end and against the bottom flange, the flanges are tied together to provide a strong, lightweight, high strength, simplified beam bumper. The hollow tie bolts 42 may also provide a highly effective connection between the bumper assembly and the energy absorber units 22 or to other support structure of the vehicle. To this end, the tie bolts extend through aligned holes 66, 68 in the outwardly extending flanges 70, 72 of the energy absorber bracket 30. In addition to providing the interconnection to this bumper flanges and the connection to the energy absorber, the hollow tie bolts 42 provide an effective backing for a resilient force transmitting face support or bulk head 74 that extends from a semi-circular inner seat 76 that fits closely on the surface of the hollow tie bolt 42 to an outer face 78 disposed against the inner side of the vertical face 36 of the bumper beam 35. This bumper face support, is preferably an open-celled force transmitting energy absorbing unit, having vertical and horizontal walls 80 and 82 which intersect to form the open cells. This bulk head 74 may be molded made from a suitable olefin or other resilient material whose walls provide resilient support for the front face and transmit impact loads to the upper and lower flanges 38, 40 via the tie bolt to eliminate or reduce face dishing.

The bulk heads are secured to the interior of the bumper by bolts 84 and 86 which extend from a connector plate 88 embedded in the elastomer bodies of block-like bumper guards 90 which are strategically located along and snugly-fitted against the outer face of the bumper. Nuts 92 threaded on the shanks of bolts 84 and 86 secure the bumper guards to the outer face of the bumper and the bulk heads to the inner face of the bumper bar as shown.

In the event the bumper guards are impacted, the cellular bulkhead resiliently deflects while providing a uniform loading the hollow cylindrical tie bolt cylinders. This reduces beaming stress on the cylinders as compared to point loading and the bolt transmits the load from the relatively weak face to the top and bottom flanges which are the strongest portions of the beam. If impact loads are sufficiently high the energy absorber units will stroke to absorb impact energy. The cylindrical bolts are lightweight hollow fasteners threaded to receive and the jam nuts to provide a bumper beam complete in a minimal number pieces. The cylindrical bolts can be made of similar material as the beam to eliminate any galvanic corrosion. The jam nuts can be coated if dissimilar materials are used. This invention requires no welding so steel and aluminum can be used. Although only a pair of face supporting bulkheads and tie bolts are illustrated, any suitable number can be employed along the beam.

While a preferred embodiment of this invention has been illustrated and described, other embodiments will become apparent to those skilled in the art. Accordingly, the present invention is set forth in the following claims.

The embodiments of the invention in which an exclusive property or privilege is claimed are defined as follows:

1. A bumper assembly for operative connection to a vehicle having a body comprising a bumper beam of selected wall thicknesses having an outer generally vertical face and upper and lower generally horizontal flanges extended toward the body of the vehicle, each of said flanges having an opening therethrough, tie bolt means extending through said holes for mechanically interconnecting said flanges to one another, said tie bolt means having a head at one end mounted adjacent to said outer surface of one of said flanges, fastener means received by the other end of said tie bolt means adjacent to the outer surface of the other of said flanges for directly mechanically connecting said flanges to one another, an energy absorbing bulk head extending from seating engagement on the tie bolt means to a terminal position engaging the inner surface of the outer face of the bumper beam, and means for attaching said bulk head to said bumper beam so that impact loads imparted to said generally vertical face are transmitted by said bulk head to said tie bolt means and along the length thereof to said upper and lower flanges to thereby inhibit dishing of said outer face of said bumper beam.

2. A bumper assembly operatively for operative connection to a vehicle comprising a bumper beam generally C-shaped in cross section having a generally vertical outer face and having upper and lower flanges extended from said face toward the vehicle, tie bolt means extending between the flanges, said tie bolt having an outwardly flared head portion on one end and fastener means on the other for rigidly joining said upper and lower flanges to one another, an energy absorbing bulk head assembly extending from direct engagement with the tie bolt means to the inner side of the outer face of the bumper beam, fastening means for attaching said bulk head to said bumper assembly so that impact loads imparted to the outer face are transmitted by said bulk head to the tie bolt along thelength thereof and through said tie bolt to upper and lower flanges to thereby inhibit deformation of said outer face.

3. A bumper assembly operatively connected to a vehicle comprising a bumper beam having an outer face, an upper and lower flanges extended from said upper face toward the vehicle from upper and lower sections of the outer face, a cylindrical tie bolt extending between the flanges to rigidly tie said flanges to one another, and a resilient energy absorbing bulk head extending from seated engagement with respect to said tie bolt into direct contact with the inner face of the bumper beam, and external bumper guard means for attaching said bulk head to said bumper assembly so that impact loads imparted thereto are transmitted by said bulk head to said tie bolt and thereby to said upper and lower flanges.

4. A bumper assembly operatively connected to a vehicle comprising a bumper beam extending laterally across one end of the vehicle and generally C-shaped in cross section, said beam having an outer face and upper and lower flanges extended toward the vehicle, a hollow cylindrical tie bolt having an integral radially flared head formed by the wall thereof on the upper end thereof for engagement with the outer side of said uppr flanges, said bolt extending between the flanges and having a threaded portion on the lower end thereof, a jam nut mounted on the threaded portion for abutting the bottom side of the lower flanges while the flared head bears against the upper side of the top flange, an open-celled resilient energy absorbing bulk head block extending from seating engagment between the ends of the tie bolt to the inner face of the bumper beam to provide face support of the beam, bumper guard means, and fastener means for attaching said bulk head to said bumper guard means to localize impact loads for transmittal to the front face of said bumper beam and from said front face of said bumper through said bulk head block to the tie bolt and from said tie bolt to said top and bottom flanges.

* * * * *